(12) United States Patent
Losch et al.

(10) Patent No.: US 7,378,815 B2
(45) Date of Patent: May 27, 2008

(54) SPEED MONITORING DEVICE

(75) Inventors: Wolfgang Losch, Bad Endbach (DE); André Mueller, Solms (DE)

(73) Assignee: Pfeiffer Vacuum GmbH, Asslar (DE)

( * ) Notice: Subject to any disclaimer, the term of this patent is extended or adjusted under 35 U.S.C. 154(b) by 0 days.

(21) Appl. No.: 11/522,247

(22) Filed: Sep. 15, 2006

(65) Prior Publication Data

US 2007/0066433 A1    Mar. 22, 2007

(30) Foreign Application Priority Data

Sep. 22, 2005    (DE) .................. 10 2005 045 284

(51) Int. Cl.
*H02P 6/06*    (2006.01)
(52) U.S. Cl. .................. 318/724; 318/254; 318/268; 318/434
(58) Field of Classification Search .............. 318/138, 318/254, 268, 434, 564, 720–724; 388/903
See application file for complete search history.

(56) References Cited

U.S. PATENT DOCUMENTS

| | | | | |
|---|---|---|---|---|
| 4,258,299 A | * | 3/1981 | Takeda et al. ............. | 318/258 |
| 4,667,114 A | * | 5/1987 | Rossi ....................... | 290/40 A |
| 4,712,372 A | * | 12/1987 | Dickey et al. .......... | 60/39.281 |
| 4,791,900 A | * | 12/1988 | Buck et al. ................ | 123/359 |
| 5,764,020 A | * | 6/1998 | Maiocchi .................. | 318/705 |
| 6,236,183 B1 | | 5/2001 | Schroeder | |
| 6,549,871 B1 | * | 4/2003 | Mir et al. ................. | 702/145 |
| 6,940,251 B1 | * | 9/2005 | Sarlioglu et al. .......... | 318/721 |
| 7,002,318 B1 | * | 2/2006 | Schulz et al. .............. | 318/782 |
| 7,184,927 B2 | * | 2/2007 | Anghel et al. ............. | 702/151 |

FOREIGN PATENT DOCUMENTS

| | | |
|---|---|---|
| DE | 4237971 | 5/1994 |
| EP | 1189335 | 3/2002 |
| EP | 1311047 | 5/2003 |
| EP | 0215896 | 10/2003 |

* cited by examiner

*Primary Examiner*—Bentsu Ro
(74) *Attorney, Agent, or Firm*—Abelman, Frayne & Schwab

(57) ABSTRACT

A device for redundant speed monitoring of a synchronous motor, which is sine-commutated without the use of sensors and which has a permanently magnetically excited rotor, has a first control unit, a drive output stage, a plurality of drive phases, and a second control unit for monitoring an electrical value of at least one of the drive phases and connected to the drive output stage for turning off the drive output stage when an improper speed state is detected.

5 Claims, 3 Drawing Sheets

SPEED MONITORING DEVICE

BACKGROUND OF THE INVENTION

1. Field of the Invention

The present invention relates to a device for redundant speed monitoring of a synchronous motor which is sine-commutated without the use of sensors and which has a permanently magnetically excited rotor, the speed monitoring device having a first control unit, a drive output stage, and a plurality of drive phases.

2. Description of the Prior Art

Synchronous motors which are sine-commutated without the use of sensors and which have a permanently magnetically excited rotor, have been successfully used in many applications. One of the advantages of such motor drives over other systems, e.g., block-commutated drives, consists in the very homogeneous curve of the torque generated by the rotating field. Therefore, drives of this type generate substantially fewer vibrations, which is desirable or even required in many applications.

These drives are often used in machines that must meet safety regulations. One of these safety regulations is that the speed must be monitored, and a maximum speed may not be exceeded. Another regulation is that the monitoring must be protected against a malfunction of the monitoring unit. It is conventional in the prior art to carry out speed monitoring by a specially installed speed sensor. This is because in the case of powering with a sinusoidal current, in contrast to block commutation, all phases must be supplied with power at all times. Whereas it is possible in block commutation to avoid the speed sensor (for example, a Hall sensor or a Hall IC) by measuring the voltage induced in the respective unpowered coil, this solution is not available in the case of powering with the sinusoidal current.

The drawback of these sensors consists in that, first of all, they constitute an additional structural component part in the area of the drive. This means, among other things, that cables and plug-in connections must be provided in order to evaluate the sensor. The second problem is that such sensors are prone to malfunction, so that more than one of them must be provided in order to implement truly reliable monitoring. In addition, the sensor components are sensitive to chemical influences and to electromagnetic or radioactive interference.

Therefore, it is the object of the invention to provide a device for redundant speed monitoring of a sensor-free sine-commutated synchronous motor in which the above-mentioned drawbacks are eliminated.

SUMMARY OF THE INVENTION

This and other objects of the present invention, which will become apparent hereinafter, are achieved by providing a monitoring device including a second control unit for monitoring an electrical value of at least one of the drive phases, and connection means for connecting the second control unit and the drive output stage, whereby the second control unit turns off the drive output stage when an improper speed state is detected.

Due to the fact that a second control unit monitors an electrical value of at least one drive phase, there is no need for a speed sensor of any kind. This eliminates a trouble-prone component part, so that reliability is noticeably increased and, in addition, costs can be reduced.

In a further development of the invention, the monitored electrical value is the voltage applied to the motor by the drive output stage in at least one phase. The measurement of this electrical value is particularly simple, so that the required expenditure is kept down.

In another development, the monitored electrical value is the current occurring in the respective drive phase. While this is not as economical as the preceding solution, it has the advantage of the currents adjusting themselves based on the interaction of the output stage with the motor, and the influence of the motor is taken into account by the current measurement.

A still further development of the present invention is based on the path the signal travels from the measurement point of the electrical value to the second control unit. It is advantageous to allow the measurement signal to be transformed by a signal transformer which is arranged in the first control unit and from which the signal is then fed to the second control unit. The transformation is accordingly effected with the same time base as the calculation of the motor model so that errors owing to different time bases are avoided and matching of time bases is unnecessary.

The absence of sensors is particularly advantageous when using the device in a vacuum pump with a high-speed rotors. Vacuum pumps of this kind are, for example, turbomolecular pumps which are often used within difficult chemical and physical environments. For this reason and for cost reasons, it is important to minimize the number of electronic components inside the vacuum pump. Further, reliable speed monitoring is ensured in these vacuum pumps because an enormous kinetic energy is stored in the rapidly rotating rotor. If this kinetic energy should be released in the event of malfunction, the housing of the vacuum pump must absorb this energy. Since the energy depends upon the speed, the speed must be limited in an efficient and reliable manner to a maximum value in order to form a sufficiently secure housing.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
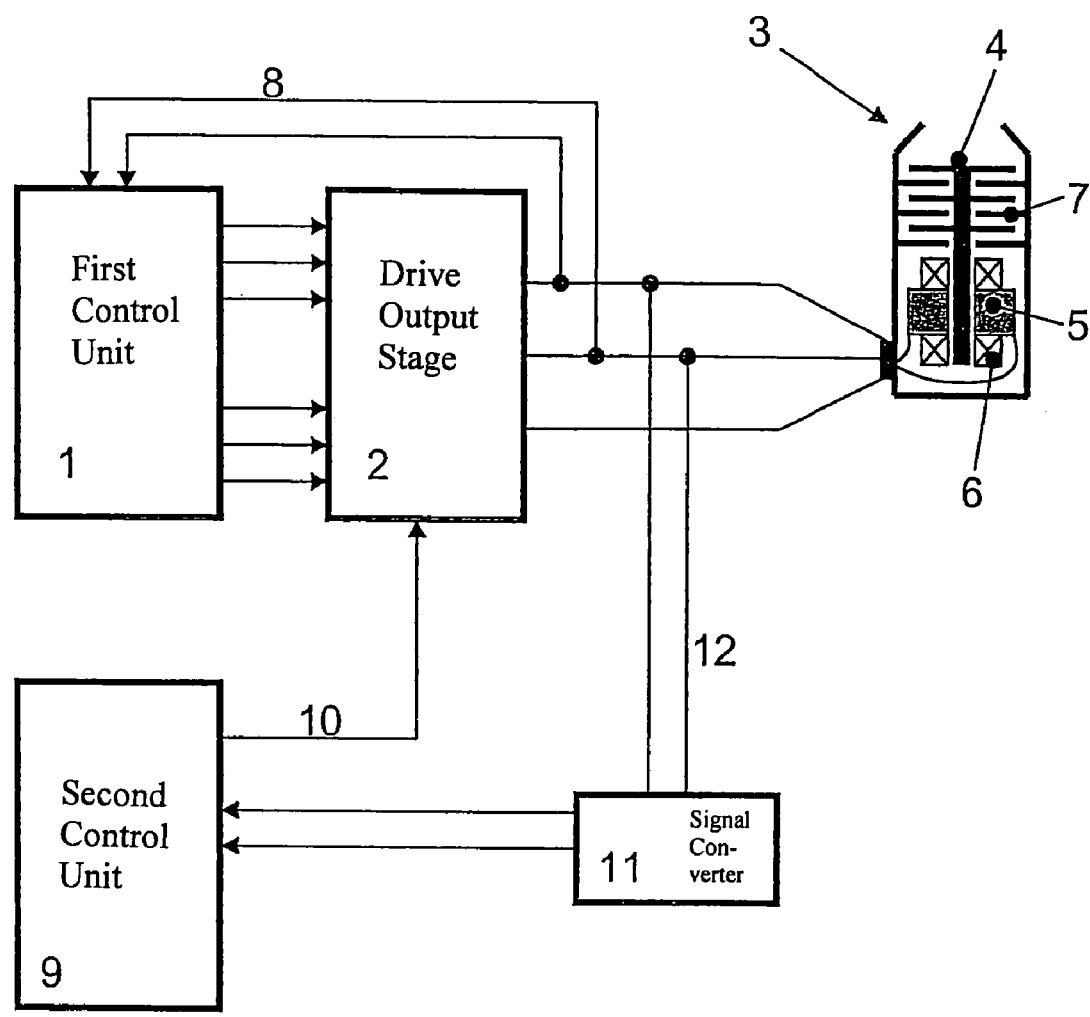
FIG. 1 a basic wiring diagram of a first embodiment of a device according to the present invention.

All embodiments of the inventive device have the following components which are described with reference to the first basic diagram and which also apply to the other diagrams. A first control unit 1 is the actual drive control unit. A motor model, as it is called, which calculates the commutation based on the physical parameters of the motor, runs in this first control unit. Further, this control unit carries out current regulation in which it evaluates the currents of two motor phases via a plurality of lines 8. The measurement of the current is shown in this instance as a point measurement only for purposes of simplification and without further details of the circuit. The first control unit provides for accelerating the motor up from zero to nominal speed. The first speed monitoring, which is carried out within the first control unit, stops the drive when excessive motor speed is detected. The use of a motor model is based on the understanding that the permanently magnetically excited rotor of a synchronous motor can only rotate at the speed of the exciting field which is generated by the motor coils. The first control unit sends the commutation signals to the drive output stage 2. In the drive output stage 2, the power given by the line voltage supply is switched to the individual motor phases corresponding to the commutation signals calculated by the motor model. A vacuum pump 3 with a high-speed rotor 4 and a pump stator 7, both carrying vanes, which cooperate to generate a pumping action, is shown schematically. The rotor is supported in bearings 6 and the motor drive 5 is formed as a permanently magnetically excited synchronous motor (PMSM). The device has, as an additional component, a second control unit 9 which monitors the rotor speed and turns off the drive output stages when there is an impermissible deviation of the rotor speed, via an output line 10. The speed monitoring is based on the information supplied by a signal converter.

In the first embodiment, the signal converter measures two voltages applied to the motor phases via lines 12.

In a second embodiment, the signal converter measures two currents occurring in the motor phases via lines 12.

Figure 2:
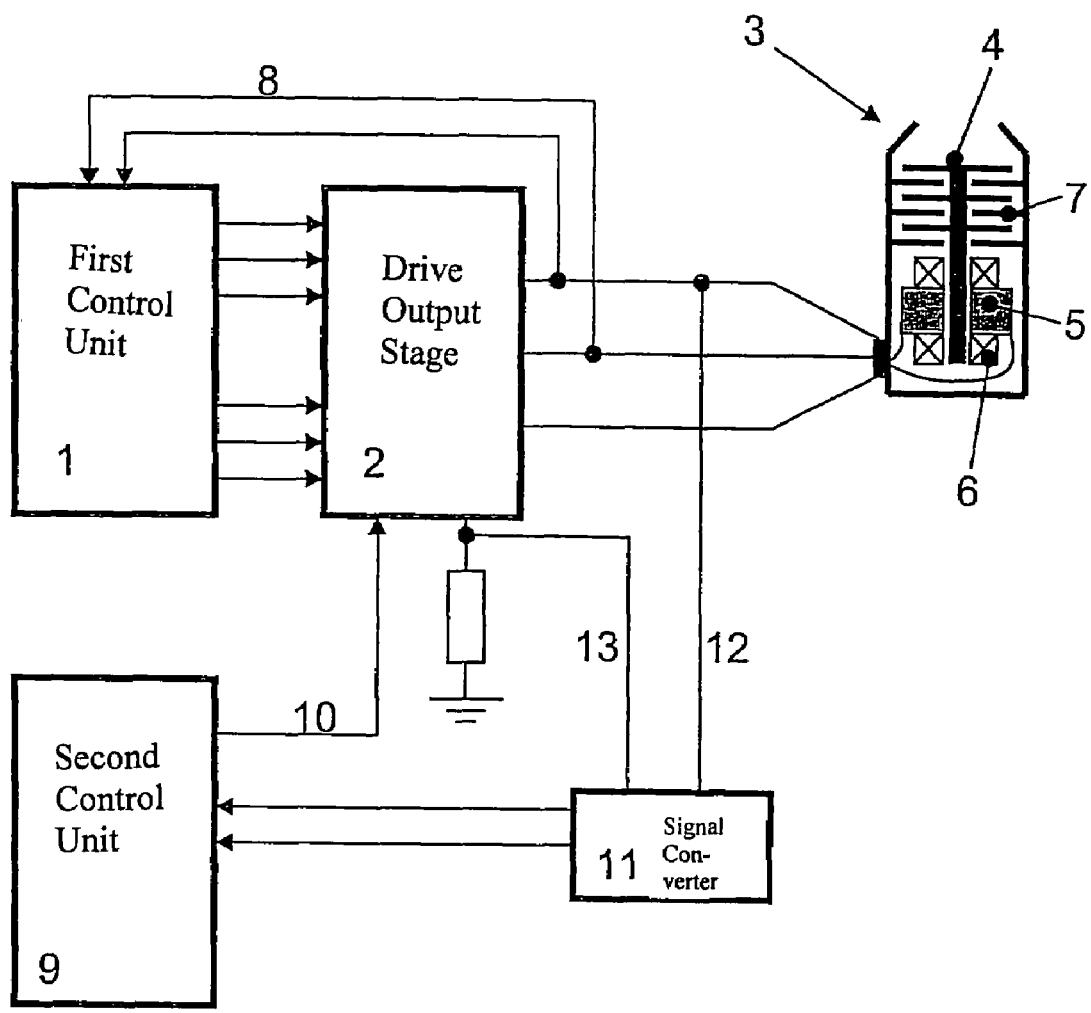
FIG. 2 a basic wiring diagram of a second embodiment of a device according to the present invention.

FIG. 2 shows another embodiment of the inventive device. The signal converter 11 measures two signals: firstly, an electrical value of a phase (voltage or current) and, second, the sum current of all phases via line 13. This is based on the fact that the addition of the three sine currents which must be present at the common base point does not give a constant. Rather, there remains a ripple or waviness in which the frequency of the three sine signals and therefore also the rotational frequency of the rotor are present. The signal converter 11 again communicates the signal to the second control unit 9 which turns off the drive output stage 6 in case of a deviation from the speed, for example, in case the maximum speed is exceeded or in case of a substantial deviation of the actual speed from the reference speed.

Figure 3:
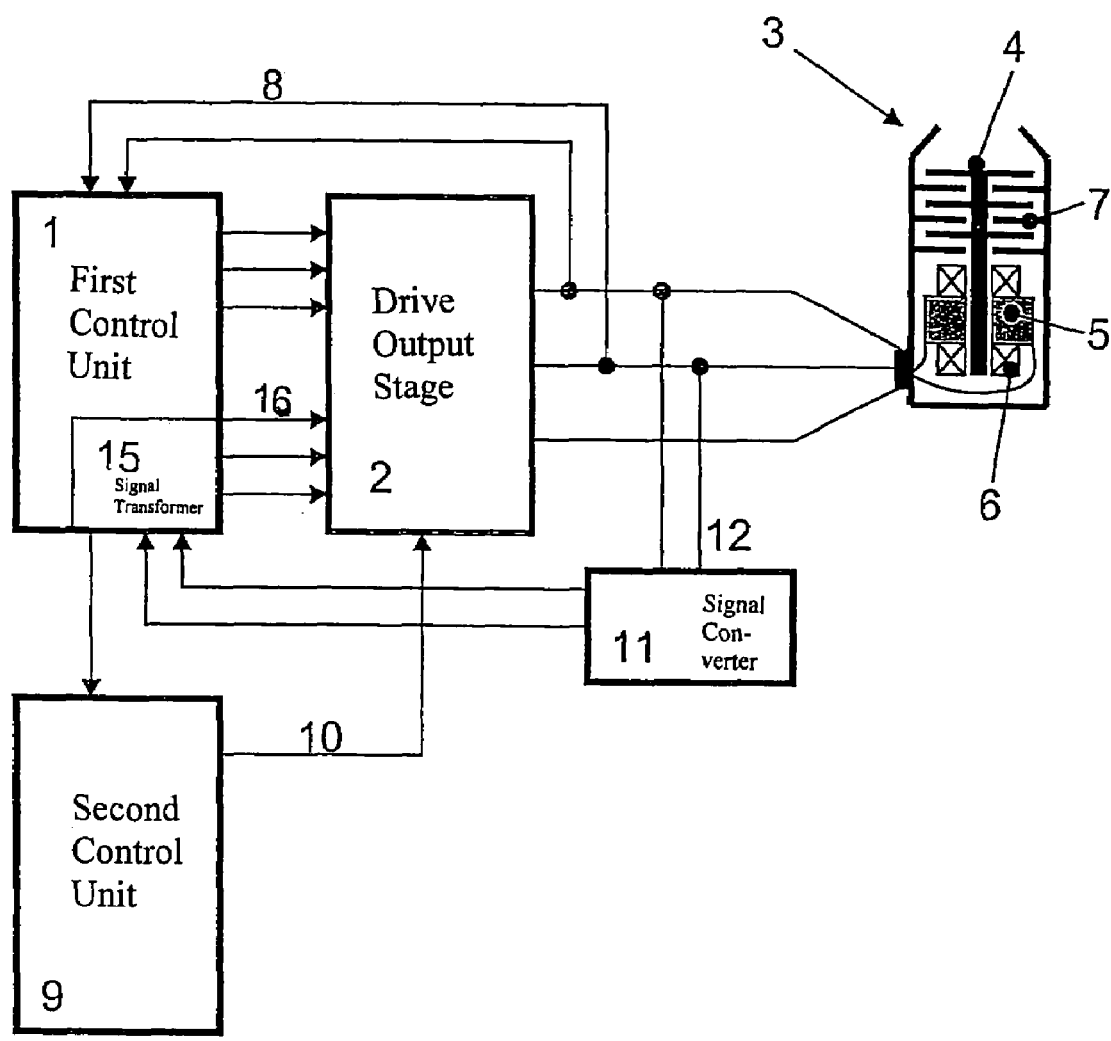
FIG. 3 a basic wiring diagram of a third embodiment of a device according to the present invention.

The embodiment of the inventive device shown in FIG. 3 has the special feature of a signal transformer 15. This signal transformer can be an individual component, but it is more advantageous to arrange it in the first control unit 1. With this signal transformer, it is possible in a particularly simple manner to carry out an electrical separation between the drive train, which comprises the first control unit, drive output stage and motor, and the second control unit. This is desirable because the drive train is operated based on the coupling in of power at high potential. The transformed signal is then fed to the second control unit by at least one line 16.

Further developments of the invention are conceivable. For example, the control units can be formed as programmable microcontrollers and as integrated switching circuits (IC). In these, the motor model and the additional functions are built-in statically. A data exchange can take place between the control units so that data about the motor itself, data about speed limits and actual values/reference values are exchanged. Dependent on the utilization ratio of the computing capacity, the second control unit can take over additional tasks having to do with the periphery of the vacuum pump 3, for example, the control of a field bus or of a temperature management system.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A device for redundant speed monitoring of a synchronous motor which is sine-commutated without the use of sensors and which has a permanently magnetically excited rotor, the device comprising a drive output stage (2) for controlling operation of the motor and having a plurality of drive phases connecting the drive output stage (2) with the motor; a first control unit (1) for monitoring a motor speed and for controlling operation of the drive output stage (2); a second control unit (9) for monitoring an electrical value of at least one of the drive phases; and connection means (10) for connecting the second control unit (9) and the drive output stage (2), wherein the second control unit (9) turns off the drive output stage (2) when an improper speed state is detected.

2. A device according to claim 1, wherein the monitored electrical value is voltage applied to the at least one drive phase.

3. A device according to claim 1, wherein the monitored electrical value is current occurring in the at least one drive phase.

4. A device according to claim 1, wherein the first control unit (1) includes a signal transformer (15) for receiving a measurement signal corresponding to the electrical value; and the device further comprises connection means (16) for communicating a transformed signal to the second control unit (2).

5. A vacuum pump system, comprising a vacuum pump including a permanently magnetically excited synchronous motor which is sine-commutated without the use of sensors and which has a permanently magnetically excited rotor; and a device for redundant speed monitoring of the synchronous motor, the device comprising a drive output stage (2) for controlling operation of the motor and having a plurality of drive phases connecting the drive output stage (2) with the motor; a first control unit (1) for monitoring a motor speed and for controlling operation of the drive output stage (2); a second control unit (9) for monitoring an electrical value of at least one of the drive phases; and connection means (10) for connecting the second control unit (9) and the drive output stage (2), wherein the second control unit (9) turns off the drive output stage (2) when an improper speed state is detected.

* * * * *